(12) United States Patent
Biermann et al.

(10) Patent No.: US 7,877,153 B2
(45) Date of Patent: Jan. 25, 2011

(54) INSTALLATION AND METHOD FOR A CONFIGURATION OF A CONTROL SYSTEM

(75) Inventors: Olaf Biermann, Bielefeld (DE); Lars Grosse, Boffzen (DE); Martin Kronmueller, Salzkotten (DE); Frank Mertens, Bad Lippspringe (DE)

(73) Assignee: Dspace Digital Signal Processing and Control Engineering GmbH, Paderborn (DE)

( * ) Notice: Subject to any disclaimer, the term of this patent is extended or adjusted under 35 U.S.C. 154(b) by 648 days.

(21) Appl. No.: 11/852,427

(22) Filed: Sep. 10, 2007

(65) Prior Publication Data

US 2008/0091279 A1 Apr. 17, 2008

(30) Foreign Application Priority Data

Sep. 15, 2006 (DE) ........................ 10 2006 044 141

(51) Int. Cl.
*G06F 19/00* (2006.01)
(52) U.S. Cl. ............................................ 700/17; 703/6
(58) Field of Classification Search .................. 700/17, 700/18, 28, 79, 83, 87, 90, 96, 266; 703/6; 422/50, 68.1
See application file for complete search history.

(56) References Cited

U.S. PATENT DOCUMENTS

| | | | | |
|---|---|---|---|---|
| 4,901,221 A | * | 2/1990 | Kodosky et al. ............. 715/771 |
| 5,168,441 A | * | 12/1992 | Onarheim et al. ............. 700/17 |
| 6,618,630 B1 | * | 9/2003 | Jundt et al. .................... 700/17 |
| 6,754,885 B1 | * | 6/2004 | Dardinski et al. ........... 717/113 |
| 7,089,530 B1 | * | 8/2006 | Dardinski et al. ........... 717/105 |
| 7,340,680 B2 | * | 3/2008 | Becker ....................... 715/738 |
| 2005/0102651 A1 | * | 5/2005 | Ueda .......................... 717/113 |

FOREIGN PATENT DOCUMENTS

| | | |
|---|---|---|
| EP | 1522910 | 4/2005 |
| EP | 1522910 B1 | 1/2008 |
| WO | 9119237 | 12/1991 |
| WO | 2005109122 | 11/2005 |

OTHER PUBLICATIONS

Brief Translation of European Search Report EP 07 01 6974, mailing date Jan. 9, 2008.

* cited by examiner

*Primary Examiner*—Kidest Bahta (57) ABSTRACT

A configuration device is provided for configuring a control system that includes at least one electronic processing unit and at least one associated I/O device. At least a portion of a control program is generated that corresponds to a configuration and is used for controlling the control system. The configuration device has at least one display device. The display device allows at least one I/O access point to be displayed in a model configuration field and/or at least one hardware functionality to be displayed in a function configuration field and/or at least one hardware interface to be displayed in an interface configuration field. It is possible to associate at least one I/O access point and at least one hardware functionality with one another and/or to associate at least one hardware functionality and at least one hardware interface with one another.

18 Claims, 10 Drawing Sheets

INSTALLATION AND METHOD FOR A CONFIGURATION OF A CONTROL SYSTEM

The present invention relates to a configuration device for configuring a control system including at least one electronic processing unit and at least one associated I/O device; it being possible to generate at least a portion of a control program that corresponds to the configuration and is intended to be used for controlling the control system; and the configuration device having at least one display device; the display device allowing at least one I/O access point to be displayed in a model configuration field and/or at least one hardware functionality to be displayed in a function configuration field and/or at least one hardware interface to be displayed in an interface configuration field; it being possible to associate at least one I/O access point and at least one hardware functionality with one another and/or to associate at least one hardware functionality and at least one hardware interface with one another. The present invention also relates to a method for generating at least a portion of an executable control program for controlling a control system including at least one electronic processing unit and at least one associated I/O device; at least one I/O access point being displayed in a model configuration field and/or at least one hardware functionality being displayed in a function configuration field and/or at least one hardware interface being displayed in an interface configuration field; at least one displayed I/O access point and at least one displayed hardware functionality being associated with one another and/or at least one displayed hardware functionality and at least one displayed hardware interface being associated with one another; the present invention further relating to a corresponding computer program.

Devices and methods for configuring control systems and for automatically or semi-automatically generating control programs for control systems are known in the art in various forms and are used primarily in applied research and industrial development in the wide field of development and application of electronic control systems, especially where, in the broadest sense, process control tasks must be accomplished. The term "control system" will be used hereinafter as a generic designation for a technical system that is mainly used for the tasks of measurement, open-loop control, closed-loop control, calibration, and which may be an electronic programmable system in the broadest sense. This term is not limited to what is restrictively defined as a "controller" from a system-theoretical point of view.

An electronic control system of the type in question includes at least one electronic processing unit; i.e., a single or multiprocessor system, which is usually operated by a real-time operating system. This processing unit is connected to the process to be controlled via suitable I/O devices.

In the context of the teaching of the present invention, I/O devices are understood to include a wide range of technical devices having one or more interfaces to the outside world. In addition to the conventional devices having analog and digital input and output channels, the devices in question include, inter alia, devices featuring intelligent signal processing for pre- and post-processing of data, data bus modules, signal conditioning devices, and also, for example, power modules. An I/O device can be a separate unit of hardware, which may be added to a processing unit (such as an internal bus slot in the processing unit, a connection via an external communications interface). However, it may also be an inseparable part of a processing unit, for example, in cases where I/O device functionality is integrally implemented in a processor. The teaching of the present invention is in no way limited to, or dependent on, any particular embodiment in hardware.

The functionality that is implemented and usable in the hardware in any given control system will hereinafter be referred to as "hardware functionality". Such functionality may include, for example, a digital-to-analog converter or an analog-digital converter, and also complex parameterizable modules, such as data buses (including the definition of the messages they transmit and the timing behavior thereof), digital signal processors (including the description for generating/analyzing signal patterns), and also modules for pulse-width modulation of signals.

In the context of the present invention, the hardware interfaces of the control system are to be distinguished from the above-described hardware functionalities. Modern control systems have a flexible hardware architecture that allows signals coming from a module having a particular hardware functionality to be routed within the control system via freely selectable signal paths (routing of signal paths). This is of interest especially for control systems which, in addition to elementary I/O devices, also include, for example, I/O devices for signal conditioning (such as conversion of current signals to voltage signals, conversion of input signals of one particular portion to output signals of another portion) and/or power modules (for example, for outputting high electrical currents or voltages). If the hardware architecture of a control system is sufficiently flexible, it is possible, for example, to freely configure which channel of an I/O device (for example, of a digital-to-analog converter) will be connected to which input channel of an I/O device for outputting power signals, to which [sic] output channel of this I/O device the power signal will be output, and on which pin of a connector the signal will ultimately be available for pick-up. The same applies analogously to signals to be read in. Especially when working with large control systems which are used, for example, in hardware-in-the-loop test benches, this property offers significant advantages over non-configurable hardwired control systems. These components of the control system will hereinafter be referred to as "hardware interfaces" of the control system.

During the installation and configuration of a control system, two basic tasks must be accomplished. In a first step, the functionality of the control system must be defined abstractly, i.e., independently of the hardware properties of the control system, within the framework of the so-called "function development". This is meant to include, for example, the mathematical description of a controller to be implemented in the control system. This function development is usually assisted by mathematical design tools that allow a block-diagram oriented design of the functionality to implemented in the control system at a later time. The result of the function development is a mathematical model of the planned, abstract functionality of the control systems. In such a model, all necessary input and output variables are abstractly known, but the model is not related in any way to the hardware functionality or to the hardware interfaces of the control system. Using this model, it is indeed possible to generate a control program which is executable in the control system, but such a control program is unable to access the hardware functionality or the hardware interfaces of the control system because no information on the configuration of the control system has been stored in the abstract model.

Therefore, in a second basic step during the installation and configuration of a control system, a connection must be established between specific input and/or output variables of the model on the one hand, and the hardware functionalities and/or hardware interfaces of the control systems on the other hand.

To accomplish the above object, it is known in the prior art to model the interfaces for the I/O devices already in the modeling environment for modeling the abstract model. For this purpose, for example, supplementary block libraries are used to describe the I/O devices and/or hardware functionalities of the control system; different blocks representing different hardware functionalities whose properties can be set in the modeling environment or the block diagram, for example, using dialog windows or similar means. If information on the hardware functionalities and hardware properties of the control system is stored in the originally abstract model, it is indeed possible to generate from the supplemented model a control program which does not only implement the abstract functionality of, for example, a control algorithm, but which at the same time also activates the hardware components of the control system in a suitable manner, such as by calling suitable drivers. However, this is bought at the expense of several disadvantages in terms of the configurability of the control system.

Another method for installing and configuring a control system, which forms a basis for the present invention, is described in EP 1 522 910 A1. In this method, the process of associating specific input and/or output variables of the abstract model with specific hardware functionalities and hardware interfaces, as well as the parameterization and configuration of the hardware functionalities and hardware interfaces, are no longer done in the abstract model. Instead, this takes place separately from the abstract model. In the abstract model, only certain signals are marked as (symbolic) I/O access points, which only means that these signals are output and/or read in as physical signals in the actual control system, using a particular hardware functionality There, the process of associating the I/O access points of the model with hardware functionalities, and the hardware functionalities with hardware interfaces, occurs independently of the model; and the capability of the different control system components to be associated is limited due to the textual, tabular method. The same applies to the orientation within the available control system components during the configuration and also during the detection of the existing configuration.

It is an object of the present invention to provide a device and method for configuring a control system and for generating at least a portion of a control program that corresponds to the configuration, by which method and device the above-mentioned disadvantages will be overcome, at least in part.

In accordance with the present invention, the above object is achieved, first of all, in a configuration device of the type in question for configuring a control system including at least one electronic processing unit and at least one associated I/O device, in that the I/O access points in the model configuration field, the hardware functionalities in the function configuration field, and the hardware interfaces in the interface configuration field can be displayed by blocks having input and/or output ports; it being possible for I/O access points and/or hardware functionalities and/or hardware interfaces to be associated with one another by graphical association means.

The configuration device according to the present invention is advantageous in many aspects over the prior art. Since the elements of the different configuration fields are represented by blocks having input and/or output ports, technical and functional units can be displayed within the configuration fields (model configuration field, function configuration field, and interface configuration field) which units, also in the configuration environment, represent hardware units and logical functional units of the control system to be configured. Unlike a purely tabular representation of separate channels of a hardware unit, for example the channels of an analog-to-digital converter, the block-oriented representation of elements of a configuration field can be structured in a clear manner and, therefore, it supports the configurability of a control system to a considerable extent by technical means. Another advantage of the inventive configuration device over the prior art is that it allows elements of the different configuration fields, i.e., I/O access points of the model configuration field, hardware functionalities of the function configuration field and hardware interfaces of the interface configuration field, to be associated in the block-oriented representation by graphical association means, as a result of which, during configuration, it is immediately clear which elements of the configuration fields have not yet been used in the configuration process and are therefore still freely available during the installation and configuration of the control system. It is also immediately clear which associations have already been made between the elements of different configuration fields. Furthermore, it is also possible to simultaneously display and identify a plurality of associations in a clear and unambiguous manner.

In a first advantageous embodiment of the present invention, the input and output ports are capable of indicating the potential and/or actual signal directions of the I/O access points in the model configuration field and/or of the hardware functionalities in the function configuration field and/or of the hardware interfaces in the interface configuration field. This embodiment of the configuration device automatically allows the signal flows within the configured control system to be traced using the configuration device, which is not possible when using the tabular associations known in the prior art. This measure at the same time helps avoid erroneous associations between I/O access points, hardware functionalities and hardware interfaces, because the input or output character of the corresponding ports of the blocks can be identified, and thus, for example, erroneous association of outputs with outputs or of inputs with inputs can be clearly and automatically detected by the configuration device.

In a further advantageous embodiment of the present invention, the displayed contents of the model configuration field and/or of the function configuration field and/or of the interface configuration field can be moved relative to each other in such a manner that I/O access points and/or hardware functionalities and/or hardware interfaces that are associated or to be associated with one another can be simultaneously displayed adjacent to each other and that, therefore, they can be associated with one another and/or configured together.

The relative movability of the contents can be restricted, for example, to one direction of movement if the contents of the configuration fields are arranged in a row- or column-like manner. The movability of the contents of two configuration fields allows any desired sub-contents of the different configuration fields to be brought into immediately adjacent relationship with each other, so that they can be associated with one another by the graphical association means, such as, for example, by signal lines. Associations that have been made between elements of different configuration fields using signal lines can be maintained during relative movement of contents of these fields because the signal lines elastically follow the relative movement. Adjacent display of the contents of different configuration fields also ensures that the configurations of I/O access points, hardware functionalities and hardware interfaces can be adjusted to each other, since they can be simultaneously viewed and matched with each other.

In another preferred exemplary embodiment, the configuration device of the present invention is designed such that for at least one selected I/O access point in the model configuration field or for at least one hardware functionality in the function configuration field or for at least one hardware interface in the interface configuration field, the associated and/or associatable I/O access points and/or hardware functionalities and/or hardware interfaces can be automatically detected and selectively displayed by means of the display device. This means that when selecting an element of one configuration field, the configuration device will automatically cause the elements of other configuration fields that are associated with the selected element to be displayed in the other configuration fields. This may be accomplished by moving the contents of the other configuration fields, or by rearranging the elements within the other configuration fields. Using this functionality, it is also possible to display for the selected element of one configuration field only those elements in the other configuration fields which can potentially be associated with the selected element. This is accomplished, for example, by displaying, for an I/O access point marked as an output, only hardware functionalities and hardware interfaces which themselves have an output functionality; i.e., which are actually able to generate an output signal.

The configuration device also supports the configuration process by detecting and displaying formal errors during the configuration, for example, when input ports and/or output ports of (different) blocks are respectively interconnected without the connecting means being connected with a complementary output port or output port.

In a particularly advantageous embodiment of the present invention, a plurality of I/O access points in the model configuration field and/or a plurality of hardware functionalities in the function configuration field and/or a plurality of hardware interfaces in the interface configuration field can be respectively combined into a higher-level unit, in particular into a higher-level block. This has the advantage, for example, that all hardware functionalities required to implement a particular functionality, such as a lambda sensor, can be grouped together and can therefore no longer be separated and torn from their context within a configuration field.

In another preferred embodiment of the present invention, all available I/O access points and/or hardware functionalities and/or hardware interfaces can be displayed and individually selected in a selection field, it being possible to transfer selected I/O access points and/or hardware functionalities and/or hardware interfaces from the selection field to the respective corresponding configuration field (model configuration field, function configuration field, interface configuration field). In this process, it is certainly intended to allow only a selection, i.e., a subset, of the available I/O access points and/or hardware functionalities and/or hardware interfaces to be arranged in the corresponding configuration field so as to configure only a manageable aspect of the control system in order, for example, to configure only those resources of the control system that are required to accomplish a particular task at any one time.

As with configuration devices known in the prior art, the configuration device of the present invention also inevitably has interfaces via which the configuration device receives information on the available I/O access points, hardware functionalities and hardware interface. Such an interface may be simply a file or database interface, but it can also be an interface to an existing modeling system and/or to a control system that exists in reality, via which interface the model created by the modeling system along with its I/O access points and/or the hardware functionalities and the hardware interfaces of the connected control system are automatically detected by the configuration device and made accessible for configuration.

The totality of available information can then be displayed in the selection field, it being possible to transfer a selection of I/O access points, hardware functionalities and hardware interfaces from the selection field to the corresponding configuration field. This is useful, for example, when using the configuration environment to configure only a limited aspect of the control system and deliberately not displaying all elements within the configuration fields for the sake of clarity.

In this context, a preferred embodiment of the configuration device is characterized in that at least one selection of I/O access points and/or hardware functionalities and/or hardware interfaces can be combined in at least one working view, it being particularly preferred not to display or allow configuration of I/O access points, hardware functionalities and hardware interfaces that are not included in the selection. Accordingly, different selections or elements of one and the same control system can be displayed and configured in different, independent working views, which supports and facilitates the configuration of a control system in a shared work process to a considerable extent. In other words, this means that the different selections of I/O access points and/or of hardware functionalities and/or of hardware interfaces of different working views may have intersections.

Referring to the aspect of the working views, a preferred configuration device is designed such that a plurality of working views can be merged into a single working view; identical I/O access points and/or hardware functionalities and/or hardware interfaces that exist multiple times being eliminated from the single working view, so that no redundancies will occur in the single working view. Preferably, the I/O access points and/or hardware functionalities and/or hardware interfaces originally belonging to different working views can be displayed such that they can be distinguished from each other, for example, by displaying them in different colors.

In accordance with another teaching of the present invention, the above object is achieved in a method for generating at least a portion of an executable control program for controlling a control system including at least one electronic processing unit and at least one associated I/O device, in that the I/O access points in the model configuration field, the hardware functionalities in the function configuration field, and the hardware interfaces in the interface configuration field are displayed by blocks having input and/or output ports, in that I/O access points and/or hardware functionalities aid/or hardware interfaces are associated with one another by graphical association means, in particular by signal lines, and in that the control program for controlling a control system, or a portion of said control program, is automatically generated using the configuration data obtained in the previous steps of the method.

In a particularly advantageous embodiment of the method according to the present invention, the displayed contents of the model configuration field and/or of the function configuration field and/or of the interface configuration field are moved relative to each other in such a manner that I/O access points and/or hardware functionalities and/or hardware interfaces that are associated or to be associated with one another are simultaneously displayed adjacent to each other and then associated with one another and/or configured together.

The inventive configuration device for configuring a control system and the inventive method can be embodied and refined in many specific ways. In this regard, reference is made to the claims that are subordinate to claims 1 and 10, and to the description of a preferred exemplary embodiment of the inventive configuration device and method for configuring a control system, which is illustrated in the drawing, wherein:

FIGS. 1 through 10 each show preferred embodiments of a configuration system 1, i.e. the portion of configuration device 1 that is visible on a display device 2. Also illustrated in FIGS. 1 through 10 is the manner in which the inventive method for configuring a control system is carried out.

Control systems of the type to which reference will be made hereinafter include an electronic processing unit and at least one associated I/O device. Neither the electronic processing unit nor the associated I/O device are graphically shown below. The final goal of the configuration is to generate, with the aid of the configuration performed on the control system, a control program by means of which the control system can be controlled. In this context, the configuration device may also generate only the portion of the control program for controlling the control system that is based on the configuration performed on the control system by means of the configuration device. This portion of the control program does not need to be independently executable in the control system, but may rather be a library of functions which is called by other programs for hardware control of the control system. Further, the configuration device is in no way limited to any particular implementation in software of the generated control program or of a portion of a control program. This may, for example, be a code that is ready-compiled and therefore directly executable in the control system used, but it may also be, for example, a byte code, which is implemented in the control system only by way of a virtual machine, and which needs to be interpreted to then be executed.

Figure 1:
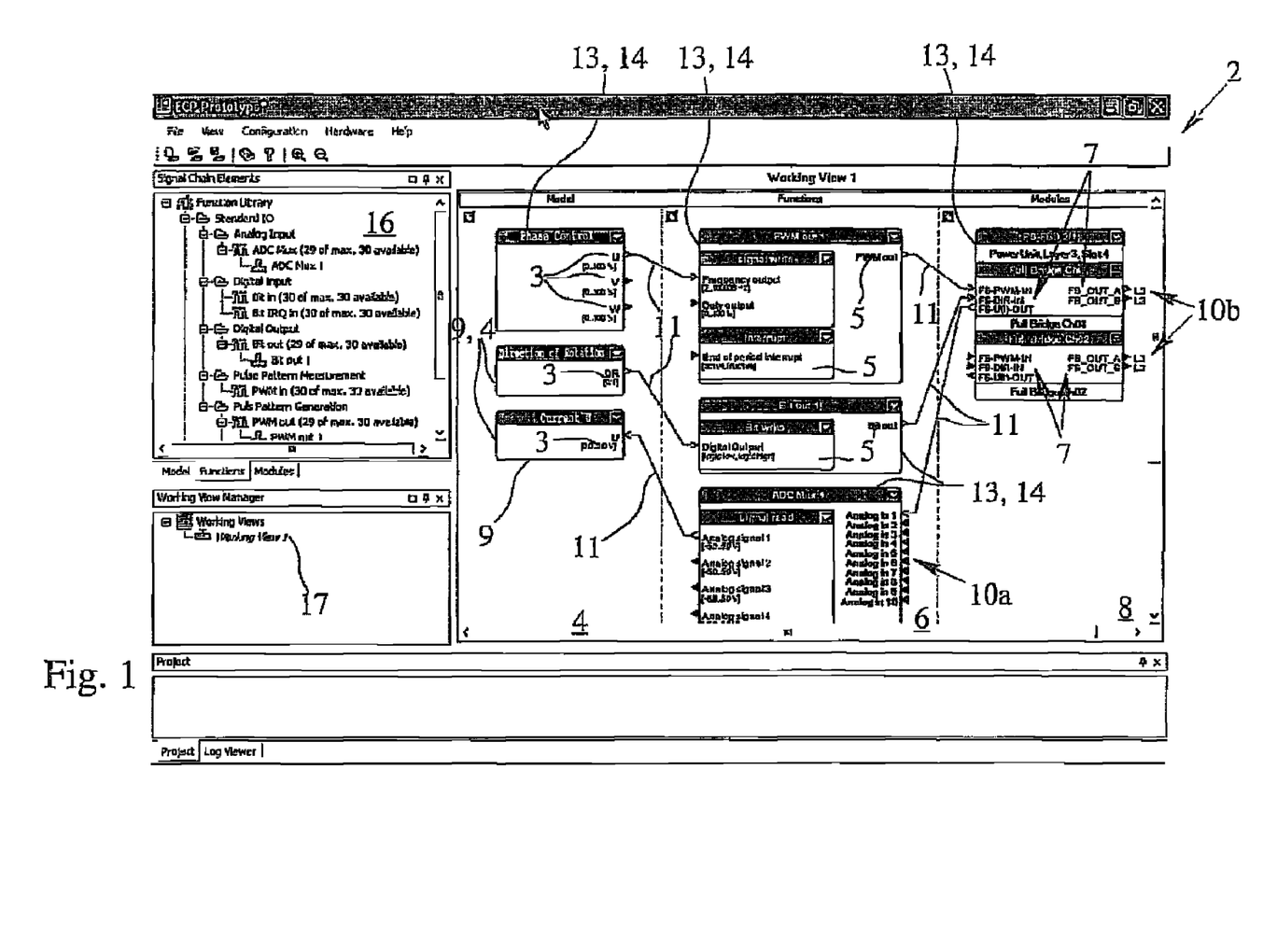
FIG. 1 illustrates the configuration of a control system using a preferred embodiment of the configuration device of the present invention.
Figure 2:
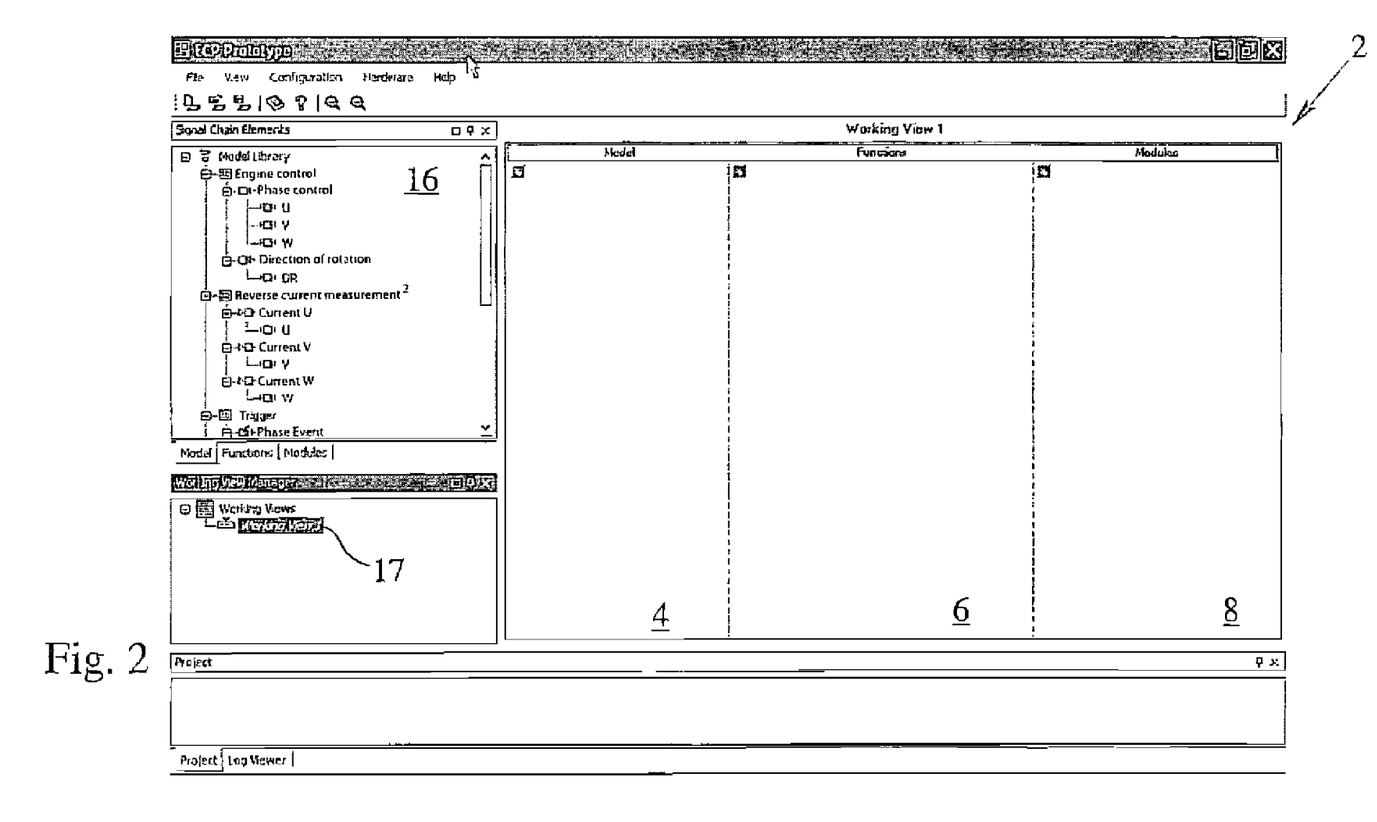
FIG. 2 shows the initial stage of the configuration of a control system using the configuration device of the present invention.
Figure 3:
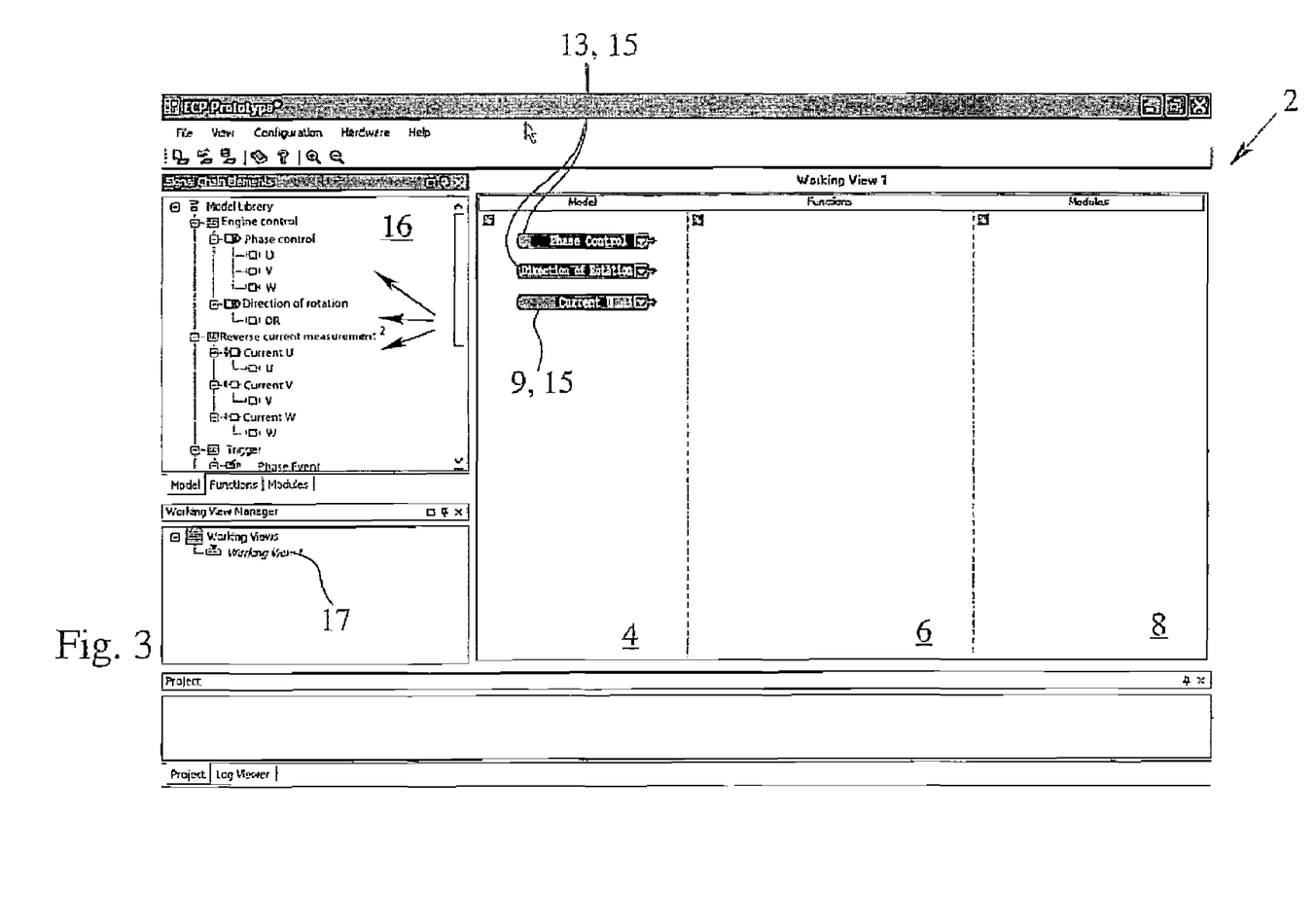
FIG. 3 illustrates an advanced stage of the configuration of a control system using the preferred embodiment of a configuration device of the present invention.

FIG. 1 shows a control system which, in part, has been ready-configured using the configuration device; the display device 2 displaying a plurality of I/O access points 3 in a model configuration field 4, a plurality of hardware functionalities in a function configuration field 6, and a plurality of hardware interfaces in an interface configuration field 8. Due to the inventive embodiment of the configuration device, it is always possible to associate I/O access points 3 with hardware functionalities 5, and to associate hardware functionalities 5 with hardware interfaces 7.

The exemplary embodiment of the inventive configuration device illustrated in FIGS. 1 through 10 is characterized in that I/O access points 3 in model configuration field 4, hardware functionalities 5 in function configuration field 6, and hardware interfaces 7 in interface configuration field 9 can be displayed by blocks 9 having input and/or output ports 10a, 10b; it being possible for I/O access points 3 and/or hardware functionalities 5 and/or hardware interfaces 7 to be associated with one another by graphical association means. In all of the exemplary embodiments illustrated in FIGS. 1 through 10, these graphical association means are implemented as signal lines 11.

The representation of I/O access points 3, hardware functionalities 5 and hardware interfaces 7 in the corresponding configuration fields 4, 6, 8 by blocks 9, and the association of individual elements of the configuration fields by signal lines 11 between input and output ports 10a, 10b of the corresponding blocks 9 simplifies and speeds up the configuration of a control system as compared to the known textual techniques.

It is particularly advantageous if input and output ports 10a, 10b are designed such that they indicate all potential and/or actual signal directions of I/O access points 3 in model configuration 4 and/or of hardware functionalities 5 in function configuration field 6 and/or of hardware interfaces 7 in interface configuration field 8, as is illustrated in FIGS. 1, 6, 8 and 9. This prevents erroneous associations, which may occur when interconnecting input ports 10a or when interconnecting output ports 10b. In the case of blocks 9 in FIGS. 1, 6, 8 and 9, the signal directions are symbolized by input and output ports 10a, 10b in the form of arrows pointing either toward or away from the respective block 9.

The exemplary embodiments of the configuration device according to FIGS. 1 through 10 are further characterized in that the displayed contents 12a, 12b, 12c of model configuration field 4 and/or of function configuration field 6 and/or of interface configuration field 8 can be moved relative to each other in such a manner that I/O access points 3 and/or hardware functionalities 5 and/or hardware interfaces 7 that are associated or to be associated with one another can be simultaneously displayed adjacent to each other and that, therefore, they can be associated with one another and/or configured together.

In FIGS. 1 through 10, it can be seen that the contents 12a, 12b, 12c of model configuration field 4 and of function configuration field 6 and of interface configuration field 8 are arranged side-by-side in the manner of columns. Since configuration fields 4, 6, 8 are of limited size, it is clear that not all contents 12a, 12b, 12c of these fields can be displayed simultaneously. Clarity in the process of associating elements of configuration fields 4, 6, 8 is ensured by the ability to move the contents 12a, 12b, 12c of configuration fields 4, 6, 8 vertically relative to each other so that the elements to be associated with one another will come to rest side-by-side and will therefore be able to be connected and/or to be configured together.

In the case of a large number of I/O access points 3, hardware functionalities 5 and hardware interfaces 7, the configuration devices shown in FIGS. 1 through 10 can optionally display only the signal lines 11 that connect visible contents 12 of configuration fields 4, 6, 8, which means that signal lines starting or ending outside of configuration fields 4, 6, 8 can be suppressed if necessary for the sake of clarity.

Figure 6:
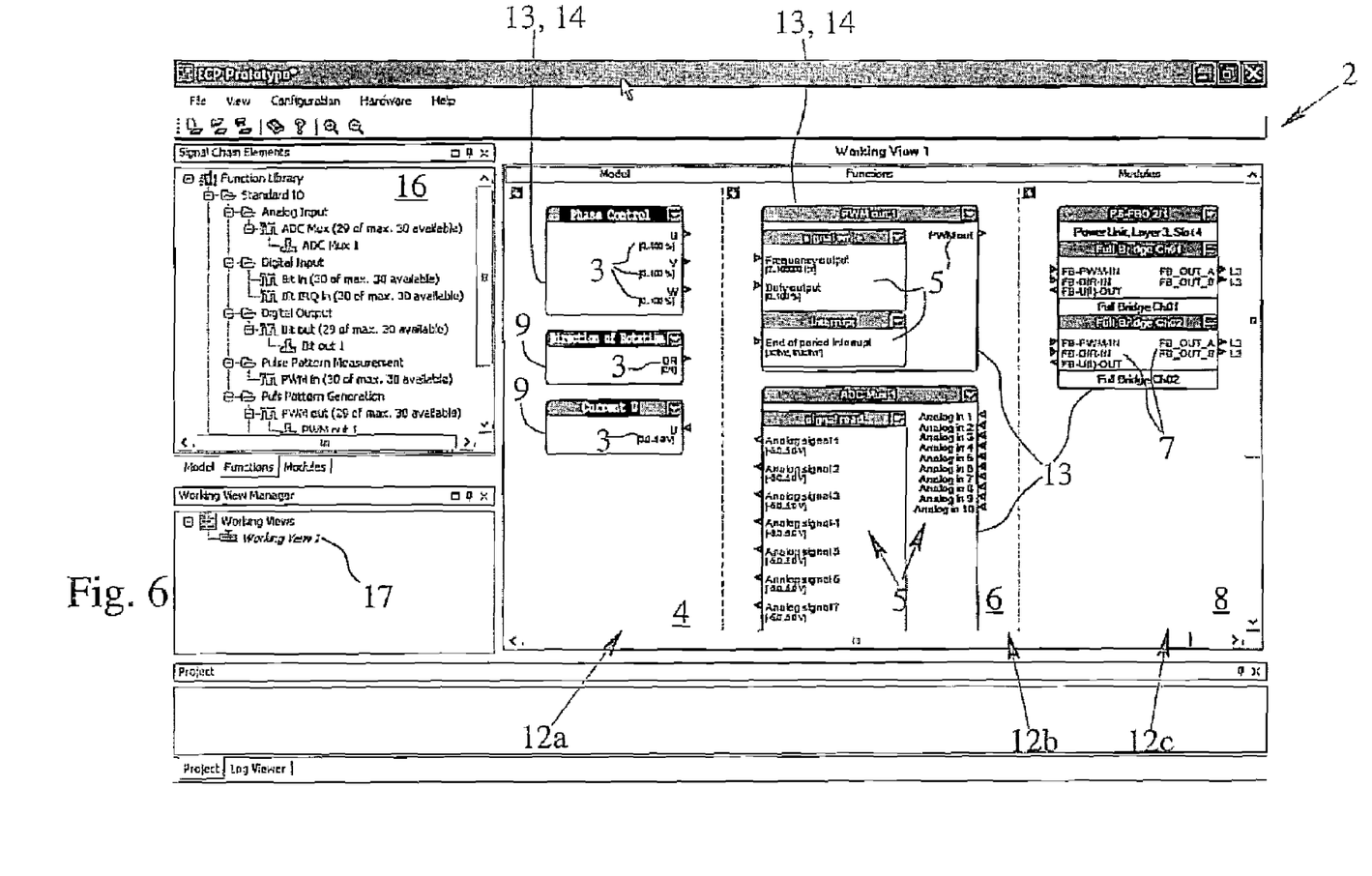
FIG. 6 shows the configuration according to FIG. 5 in a expanded block representation.
Figure 7:
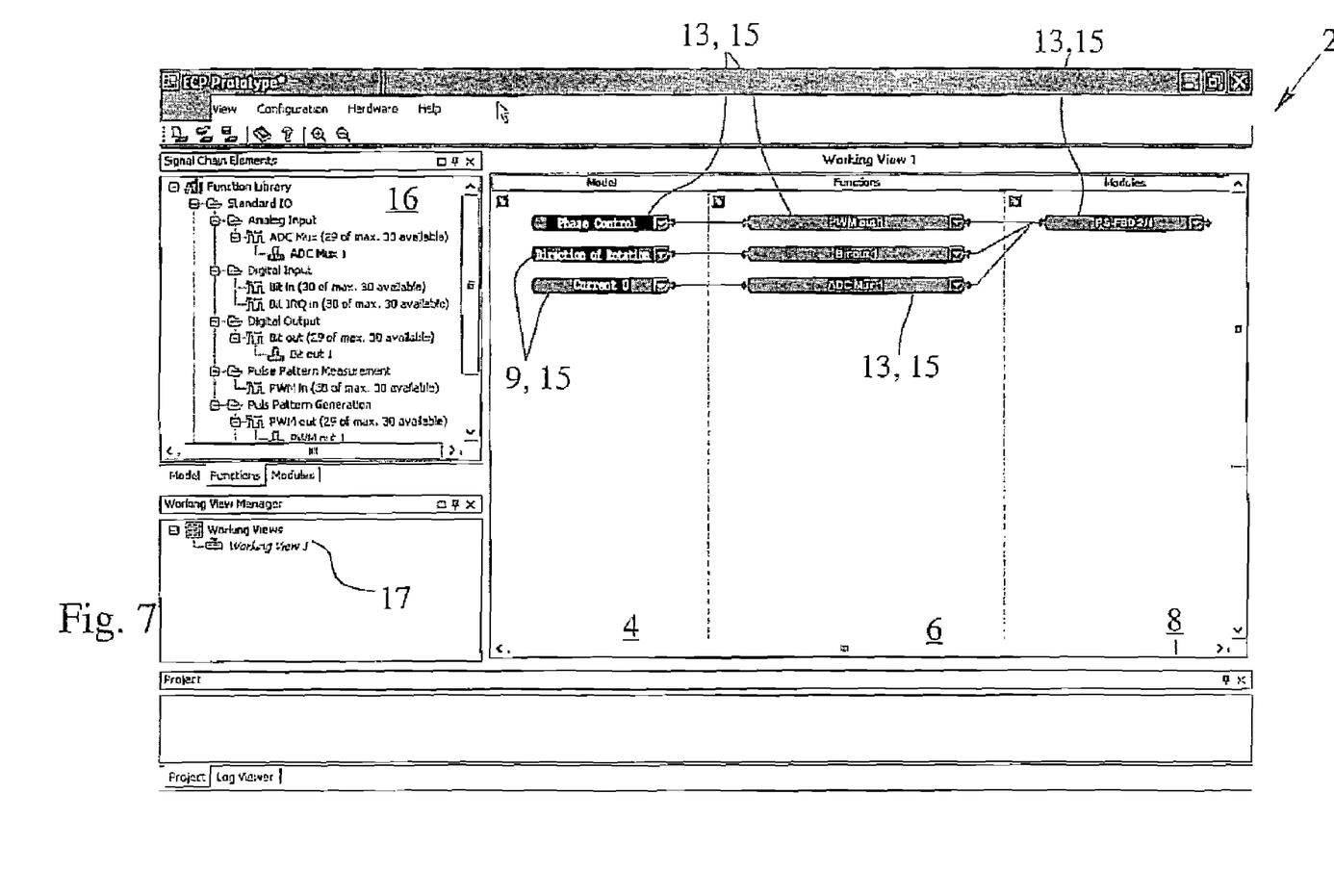
FIG. 7 shows the configuration according to FIG. 1 in a reduced block representation.
Figure 8:
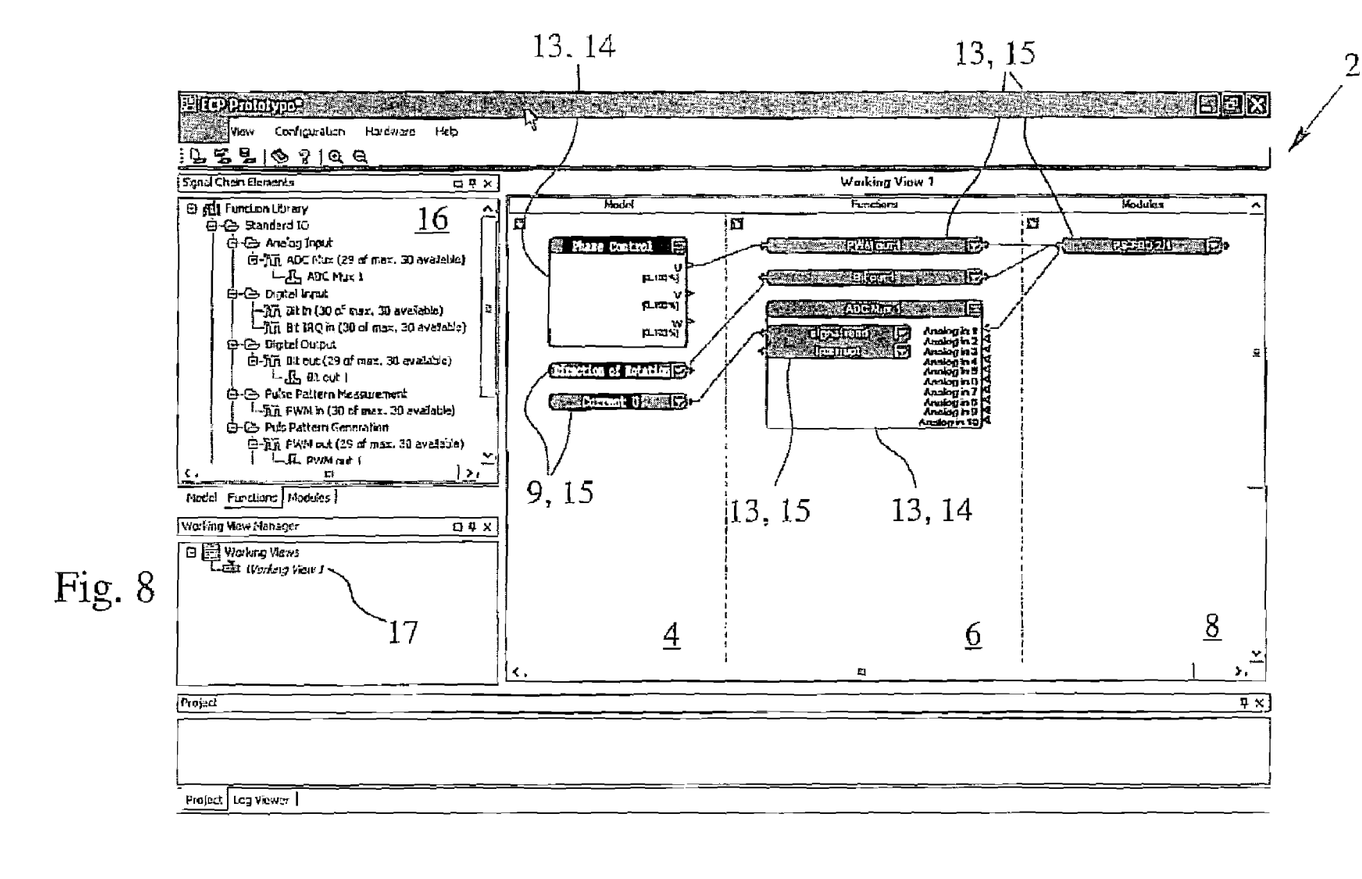
FIG. 8 shows the configuration according to FIGS. 1 and 7 in a mixed representation containing reduced and expanded blocks.
Figure 9:
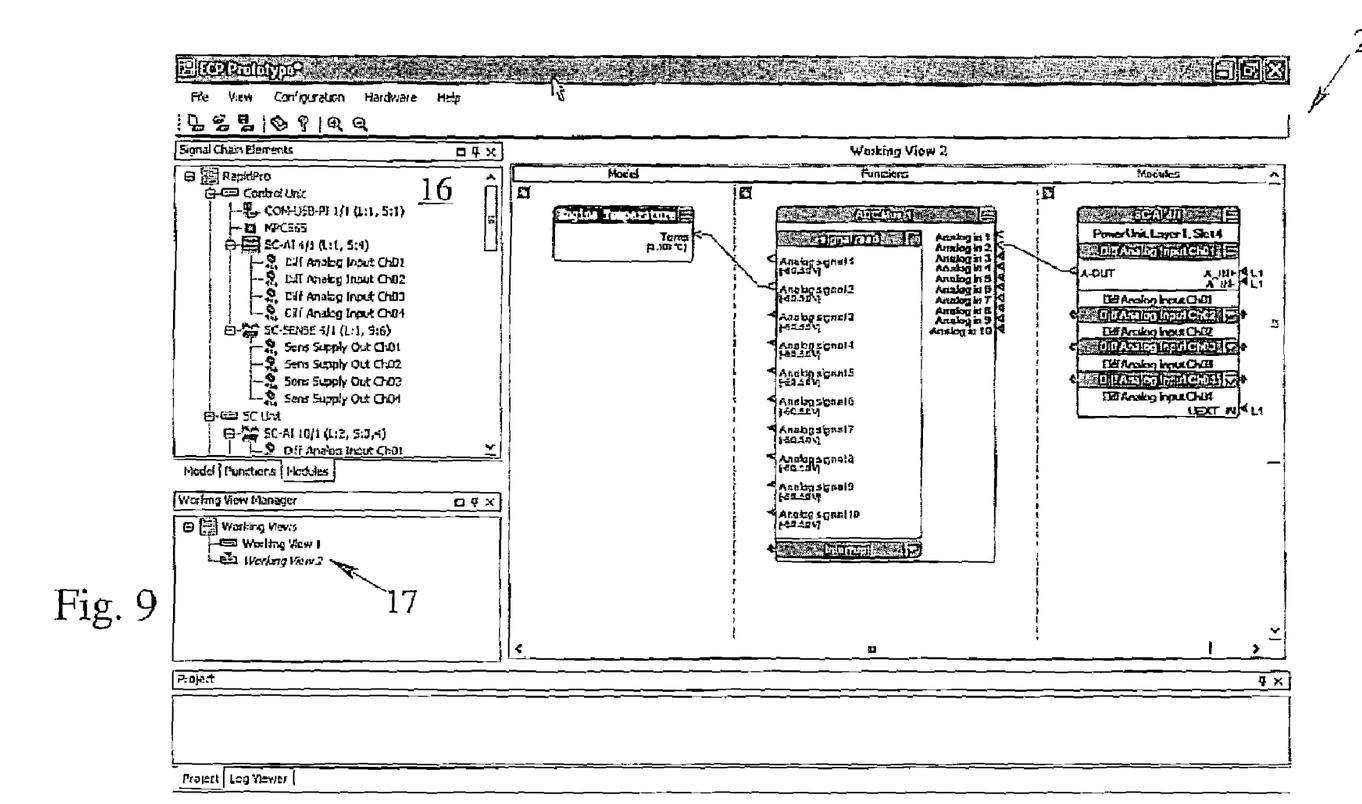
FIG. 9 illustrates another configuration of a control system in accordance with a preferred embodiment of the configuration device of the present invention.
Figure 10:
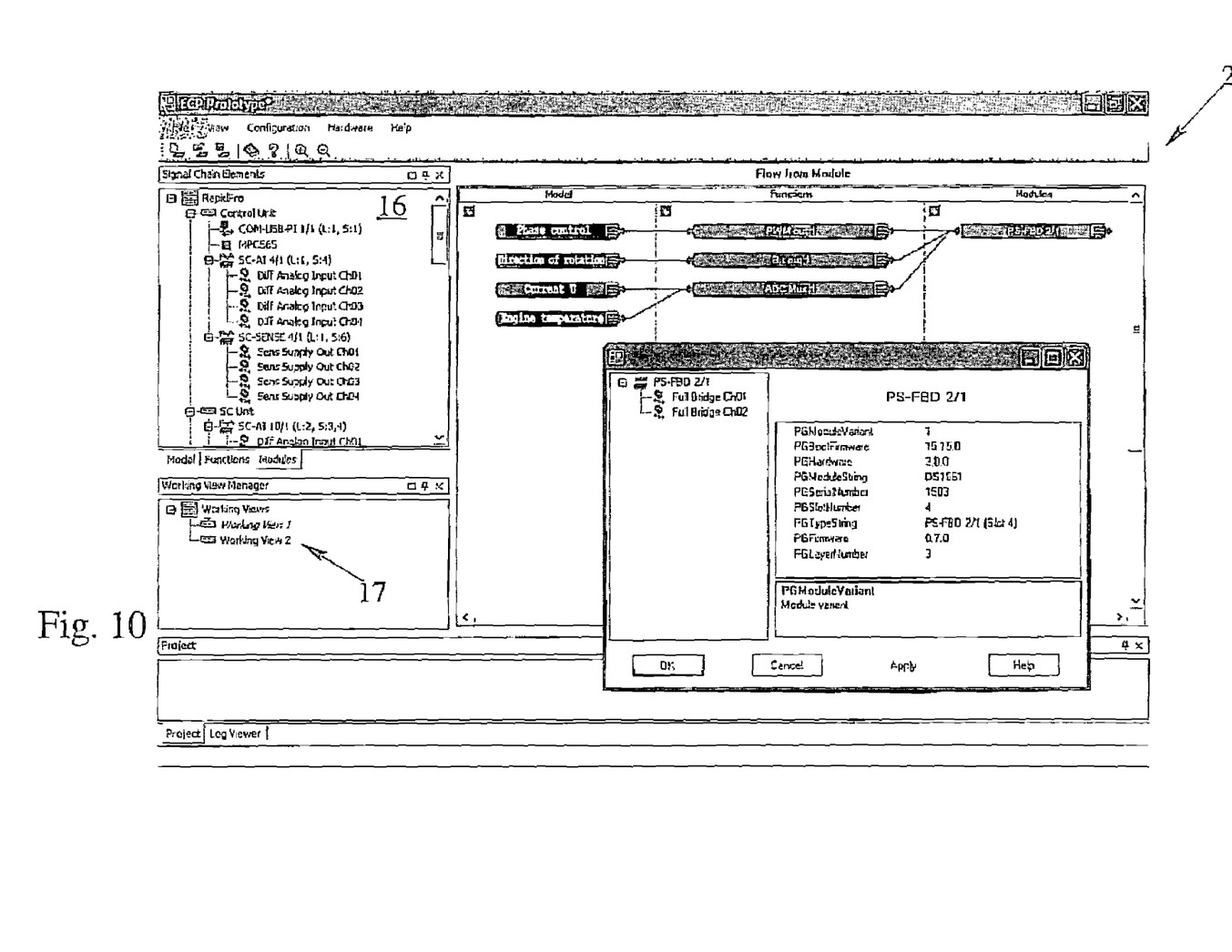
FIG. 10 illustrates a last example of the configuration of a control system using the configuration device and method of the present invention.

In FIGS. 1, 6, 7 and 8, it can be seen that, using the configuration devices shown, a plurality of I/O access points 3 in model configuration field 4 or a plurality of hardware functionalities 5 in function configuration field 6 and/or a plurality of hardware interfaces 7 in interface configuration field 8 can be combined into a higher-level unit 13, respectively. In all cases shown, higher-level units 13 are represented by higher-level blocks. This property makes it possible, for example, to combine all hardware-connected or functionally connected hardware functionalities 5 into one higher-level unit 13. In FIGS. 1, 6 and 8, for example, model configuration field 4 shows the higher-level unit 13 "Phase Control," function configuration field 6 shows the higher-level units 13 "PWM out 1" and "ADC Mux 1", and interface configuration field 8 contains the block called "PS-FBD 2/1" as a higher-level unit 13.

In the exemplary embodiments of a configuration device shown in FIGS. 1 through 10, it has proven to be particularly advantageous if a higher-level unit 13 is displayed in an expanded representation 14 (see, for example, all higher-level units 13 in FIGS. 1 and 6) which allows all input and output ports 10a, 10b of the I/O access points 3 or hardware functionalities 5 or hardware interfaces 7 included in the higher-level unit 13 to be displayed separately, or, alternatively, if all input and output ports 10a, 10b of the I/O access points 3 or hardware functionalities 5 or hardware interfaces 7 that are included in a higher-level unit 13 are displayed by the higher-level unit 13 in a reduced representation 1S by means of at least one common input and/or at least one output port 10c, 10d.

FIGS. 3 through 5 and 7 show purely reduced representations 15 of higher-level units 13, while FIG. 8 shows higher-level units 13 in a mixed representation, partly in an expanded representation 14 and partly in a reduced representation 15. In the illustrated exemplary embodiment of the configuration device of the present invention, higher-level units 13 can also be nested, which can also be seen in FIG. 8. In this regard, reference is made to the higher-level unit 13 which is called "ADC Mux 1" and contains the further higher-level unit 13 "signal read" which can also be displayed in expanded or reduced form, independently of the expanded or reduced representation of higher-level unit 13 "ADC Mux 1".

All exemplary embodiments of a configuration device shown in FIGS. 1 through 10 are further characterized in that all available I/O access points 3 and/or hardware functionalities 5 and/or hardware interfaces 7 are displayed in a selection field 16 and can be selected individually or in groups in a selection field 16. Selected I/O access points 3 and/or hardware functionalities 5 and/or hardware interfaces 7 can then be transferred from selection field 16 to the respective corresponding configuration field 4, 6, 8.

Figure 4:
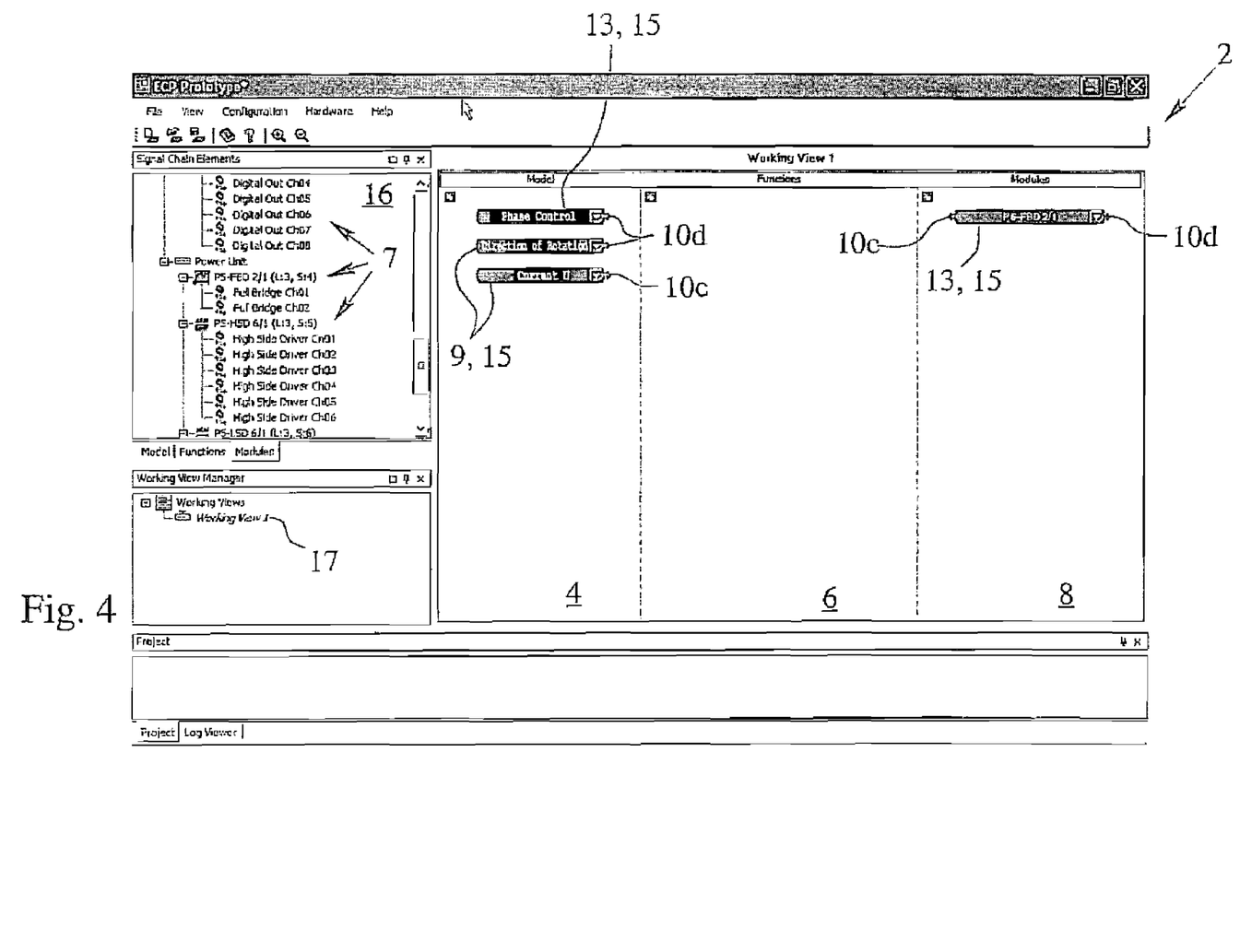
FIG. 4 illustrates a still further advanced stage of the configuration of a control system using the preferred embodiment of a configuration device according to the present invention.
Figure 5:
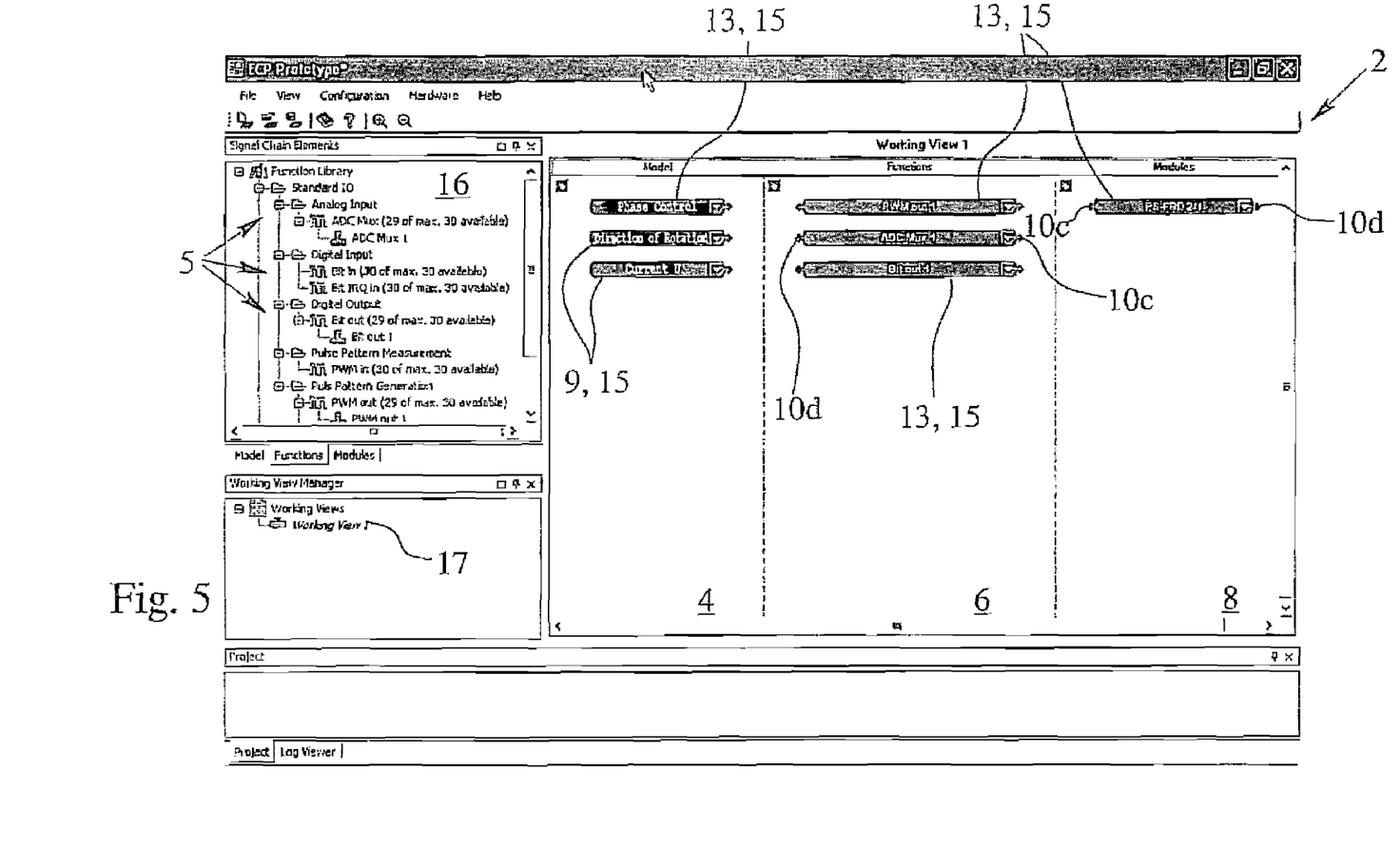
FIG. 5 illustrates a still further advanced stage of the configuration of a control system using the preferred embodiment of a configuration device according to the present invention.

FIGS. 2 through 5 illustrate step-by-step how, initially, I/O access points 3, or higher-level units 13 containing I/O access points 3, are selected from selection field 16 and placed in model configuration field 4. In FIG. 4, the hardware interface 7 called "PS-FPD 2/1" is selected from the plurality of available hardware interfaces 7 and placed in interface configuration field 8. Similarly, FIG. 5 shows how the hardware functionalities 5 called "PVVM out 1", "ADC Mux 1" and "Bit out 1" have been selected from selection field 16 and placed in function configuration field 6.

In each of the embodiments of configuration devices exemplarily shown in FIGS. 1 through 10, a selection of I/O access points 3 and/or of hardware functionalities 5 and/or of hardware interfaces 7 have been combined in a working view 17. It is possible to combine a plurality of selections of I/O access points 3 and/or hardware functionalities 5 and/or hardware interfaces 7 that partially overlap in content in different working views 17, so that different aspects of the control system to be configured can be selectively processed without irrelevant I/O access points 3 or hardware functionalities 5 or hardware interfaces 7 distracting from the actual task at hand.

Thus, FIGS. 1 through 10 also illustrate a variant of the claimed inventive method for generating at least a portion of an executable control program for controlling a control system, in which at least one I/O access point 3 is displayed in a model configuration field 4 and/or at least one hardware functionality 5 is displayed in a function configuration field 6 and/or at least one hardware interface 7 is displayed in an interface configuration field 8, and/or at least one displayed I/O access point 3 and at least one displayed hardware functionality 5 are associated with one another and/or at least one displayed hardware functionality 5 and at least one displayed hardware interface 7 are associated with one another; and in which, moreover, I/O access points 3 in model configuration field 4, hardware functionalities 5 in function configuration field 6, and hardware interfaces 7 in interface configuration field 8 are displayed by blocks 9 having input and/or output ports 10a, 10b; I/O access points 3 and/or hardware functionalities 5 and/or hardware interfaces 7 then being associated with one another by graphical association means, in particular by signal lines 11; and in which, ultimately, the control program for controlling a control system, or a portion of said control program, is automatically generated using the configuration data obtained in the previous steps of the method. This follows, in particular, from the method steps illustrated in FIGS. 2 through 5.

What is claimed is:

1. A configuration device for configuring a control system, comprising:
   at least one electronic processing unit and at least one I/O device configured to generate at least a portion of a control program that corresponds to a configuration and controls the control system;
   at least one display device configured to allow at least one of I/O access points to be displayed in a model configuration field, hardware functionalities to be displayed in a function configuration field and hardware interfaces to be displayed in an interface configuration field;
   wherein the I/O access points in the model configuration field, the hardware functionalities in the function configuration field, and the hardware interfaces in the interface configuration field are configured to be displayed by blocks having at least one of input and output ports, at least one of the I/O access points, the hardware functionalities and the hardware interfaces being configured to be associated with one another by a graphical association arrangement that is configured to elastically follow a relative movement of configuration field contents in response to user input.

2. The configuration device recited in claim 1, wherein the graphical association arrangement includes a signal line.

3. The configuration device recited in claim 1, wherein the at least one of input and output ports are configured to indicate at least one of at least one of the potential and actual signal directions of the I/O access points in the model configuration field, the hardware functionalities in the function configuration field, and the hardware interfaces in the interface configuration field.

4. The configuration device recited in claim 1, wherein the at least one of input and output ports are configured to indicate at least one of the potential and actual signal directions of the I/O access points in the model configuration field.

5. The configuration device recited in claim 1, wherein the at least one of input and output ports are configured to indicate at least one of the hardware functionalities in the function configuration field and of the hardware interfaces in the interface configuration field.

6. The configuration device recited in claim 1, wherein the displayed contents of at least one of the model configuration field, the function configuration field and the interface configuration field are configured to be moved relative to each other in such a manner that at least one of the I/O access points and the hardware functionalities and the hardware interfaces that are associated or to be associated with one another are simultaneously displayed adjacent to each other so as to be at least one of associatable with one another and configurable together.

7. The configuration device recited in claim 1, wherein for at least one of a first selected I/O access point in the model configuration field, a first hardware functionality in the function configuration field and a first hardware interface in the interface configuration field, at least one of the associated and/or associatable I/O access points, hardware functionalities and hardware interfaces are automatically detectable and selectively displayable by the display device.

8. The configuration device recited in claim 1, wherein at least one of a plurality of the I/O access points in the model configuration field, a plurality of the hardware functionalities in the function configuration field and a plurality of the hardware interfaces in the interface configuration field are configured to be respectively combined into a higher-level unit.

9. The configuration device recited in claim 8, wherein the higher-level unit is a higher-level block.

10. The configuration device recited in claim 8, wherein all input and output ports of the I/O access points or hardware functionalities or hardware interfaces that are included in a higher-level unit are displayable separately by the higher-level unit in an expanded representation and all input and output ports of the I/O access points or hardware functionalities or hardware interfaces that are included in a higher-level unit are displayable by the higher-level unit in a reduced representation by at least one of a common input and a common output port.

11. The configuration device recited in claim 8, wherein all input and output ports of the I/O access points or hardware functionalities or hardware interfaces that are included in a higher-level unit are displayed separately by the higher-level unit in an expanded representation or all input and output ports of the I/O access points or hardware functionalities or hardware interfaces that are included in a higher-level unit are displayed by the higher-level unit in a reduced representation by at least one of at least one common input and at least one output port.

12. The configuration device recited in claim 1, wherein at least one of all available of the I/O access points, hardware functionalities and hardware interfaces are configured to be displayed and individually selected in a selection field, at least one of the selected I/O access points, hardware functionalities and hardware interfaces being transferable from the selection field to the model configuration field, the function configuration field or the interface configuration field.

13. The configuration device recited in claim 1, wherein a selection of at least one of a selection of the I/O access points, the hardware functionalities and the hardware interfaces are configured to be combined in at least one working view, at least one of the selection of I/O access points, hardware functionalities and hardware interfaces of different working views being configured to have intersections.

14. The configuration device as recited in claim 13, wherein a plurality of working views can be merged into a single working view and at least one of identical I/O access points and hardware functionalities and hardware interfaces that exist multiple times are eliminated from the single working view; and at least one of the I/O access points, hardware functionalities and hardware interfaces originally belonging to different working views are configured to be displayed such that they can be distinguished from each other.

15. A processor readable medium comprising instructions executable by a processor of a data processing system, the data processing system having a display device, the instructions including a program code configured to generate at least a portion of a control program that corresponds to a configuration and controls a control system; the display device configured to allow at least one of I/O access points to be displayed in a model configuration field, hardware functionalities to be displayed in a function configuration field and hardware interfaces to be displayed in an interface configuration field; wherein the I/O access points in the model configuration field, the hardware functionalities in the function configuration field, and the hardware interfaces in the interface configuration field are configured to be displayed by blocks having at least one of input and output ports; at least one of the I/O access points, the hardware functionalities and the hardware interfaces being configured to be associated with one another by a graphical association arrangement that is configured to elastically follow a relative movement of configuration field contents in response to user input.

16. A method for generating at least a portion of an executable control program for controlling a control system including at least one electronic processing unit and at least one associated I/O device, the method comprising:
  displaying an I/O access point in a model configuration field, a hardware functionality in a function configuration field and a hardware interface in an interface configuration field by blocks having at least one of input and output ports;
  associating at least one of the displayed I/O access point, the displayed hardware functionality and the displayed hardware interface with one another by a graphical association arrangement so as to obtain configuration data, the graphical association arrangement configured to elastically follow a relative movement of configuration field contents in response to user input; and
  automatically generating the at least one portion of the control program using the obtained configuration data.

17. The method as recited in claim 16, wherein the displayed contents of at least one of the model configuration field, the function configuration field and the interface configuration field are moved relative to each other such that at least one of the I/O access points, hardware functionalities and hardware interfaces that are associated or to be associated with one another are simultaneously displayed adjacent to each other and then at least one of associated with one another and configured together.

18. A processor readable medium comprising instructions executable by a processor for performing operations, the operations comprising generating at least a portion of an executable control program for controlling a control system including at least one electronic processing unit and at least one associated I/O device, the operations further comprising:
  displaying an I/O access point in a model configuration field, a hardware functionality in a function configuration field and a hardware interface in an interface configuration field by blocks having at least one of input and output ports;
  associating at least one of the displayed I/O access point, the displayed hardware functionality and the displayed hardware interface with one another by a graphical association arrangement so as to obtain configuration data, the graphical association arrangement configured to elastically follow a relative movement of configuration field contents in response to user input; and
  automatically generating at least the portion of the control program using the obtained configuration data.

* * * * *